Apr. 10, 1923.

M. B. MUXEN

DISPENSING APPARATUS

Filed Apr. 10, 1919

M. B. MUXEN

DISPENSING APPARATUS

Filed Apr. 10, 1919 6 sheets-sheet 3

Apr. 10, 1923.

M. B. MUXEN

1,451,552

DISPENSING APPARATUS

Filed Apr. 10, 1919

Matthew B. Muxen  INVENTOR.
BY
A. G. Burns  ATTORNEY.

Apr. 10, 1923.

M. B. MUXEN 1,451,552

DISPENSING APPARATUS

Filed Apr. 10, 1919

Matthew B. Muxen INVENTOR.

BY

H. G. Burns ATTORNEY

Patented Apr. 10, 1923.

1,451,552

UNITED STATES PATENT OFFICE.

MATTHEW B. MUXEN, OF FORT WAYNE, INDIANA, ASSIGNOR TO TOKHEIM OIL TANK AND PUMP COMPANY, A CORPORATION OF INDIANA.

DISPENSING APPARATUS.

Application filed April 10, 1919. Serial No. 288,967.

*To all whom it may concern:*

Be it known that I, MATTHEW B. MUXEN, a citizen of the United States of America, and resident of Fort Wayne, in the county of Allen and State of Indiana, have invented certain new and useful Improvements in Dispensing Apparatus, of which the following is a specification.

This invention relates to improvements in dispensing apparatus especially of that class used for dispensing liquid fuel, and is adapted to be erected and operated out of doors.

The objects of the invention are: first, to provide an apparatus which will enable patrons to observe the quantity of fuel delivered from the apparatus; second, to provide a transparent graduated measure for the reception of fuel preparatory to its delivery to the customer and to so arrange the controlling mechanism for the inlet of fuel to the measure and the discharge therefrom as to insure the delivery of the fuel in full quantity as shown by the measure; third, to provide means actuated by the discharge of fuel from the measure for recording the amount of fuel delivered to patrons; fourth, to provide a compensating means for the recording device to correct inaccuracy; fifth, to provide a shelter for the dispensing device having doors which may be moved so as to expose the measure and permit access to the controlling mechanism; sixth, to provide locking means in conjunction with the doors to prevent the delivery of fuel from the measure until the doors are entirely open and the drain-back outlet closed; and seventh, to afford a fuel dispensing apparatus having controlling members which govern its several functions so arranged as to prevent their simultaneous operation and possible confusion.

The foregoing objects are accomplished by the construction illustrated in the accompanying drawings, in which:

Fig. 1 is a front elevation of the apparatus with the housing shown in vertical section;

Fig. 2 is a similar view of the same in a plane at right angles to that of Fig. 1;

Similar characters of reference indicate corresponding parts throughout the several views and referring now to the same:

The apparatus is provided with a pedestal comprised of a base 1 and a capital 2 that are spaced apart, there being a cylindrical shell 3 extending from the base to the capital and enclosing the space therebetween. The base and capital are also connected together by a frame constructed of pipes 4 and 4', and attached to the frame is a horizontal platform 5 upon which is mounted an electric motor 6. To the underside of the platform 5 is secured a pump 7, which is of the rotary type, and the motor and pump each have a sprocket-wheel, 8 and 9 respectively, that are connected together by a drive-chain 10 so that as the motor rotates the pump is operated thereby. From the lower part of the pump extends a suction pipe 11 intended for connection with a suitable supply of liquid fuel held in storage.

Figures 1, 2, 17:
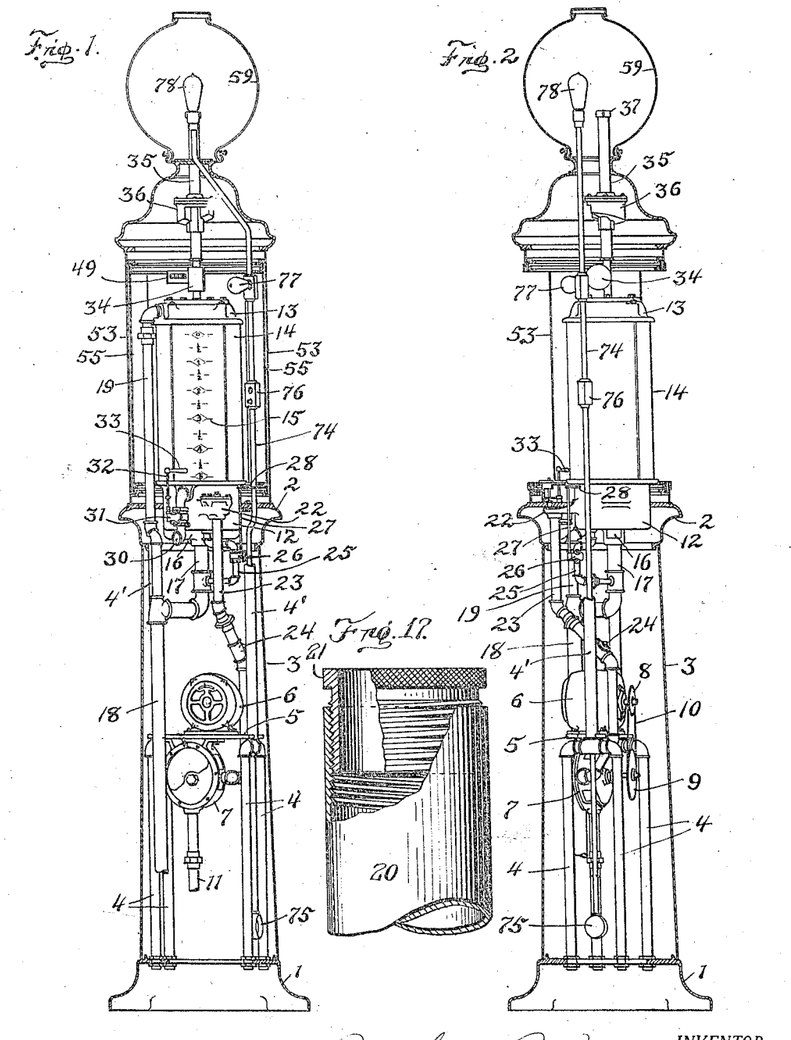
Figure 3:
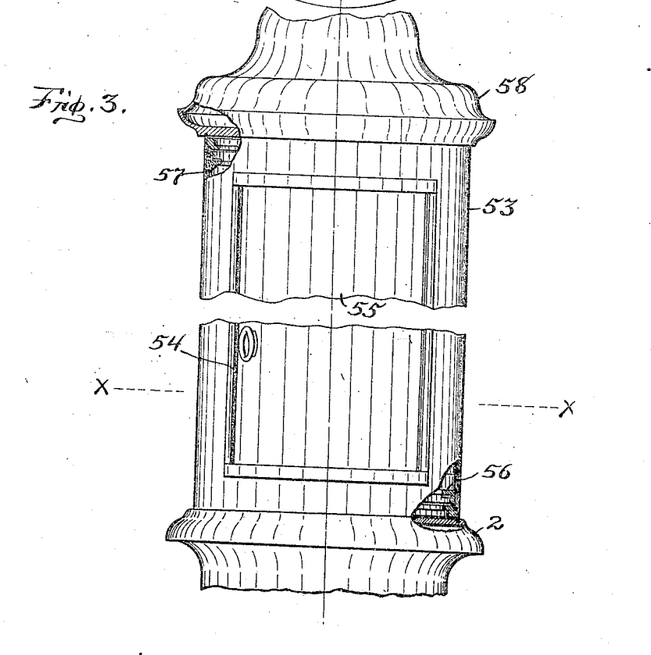
Fig. 3 is a detail view showing a front elevation of the upper housing for enclosing the measure and operating members, the parts of the housing being cut away and in section.
Figure 4:
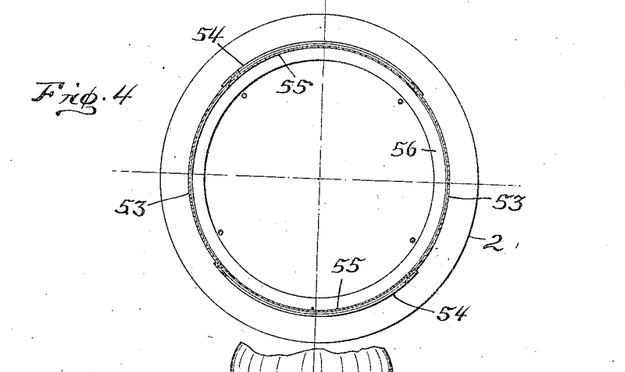
Fig. 4 is a transverse section of Fig. 3 on the line x—x thereof.
Figure 5:
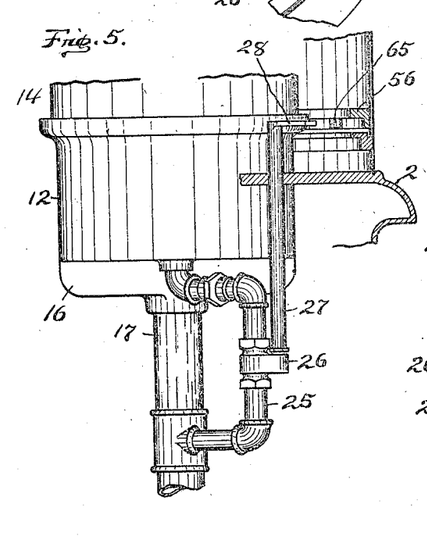
Fig. 5 is a detail view showing a drain-valve coupled with the measure and means for operating the valve.
Figure 6:
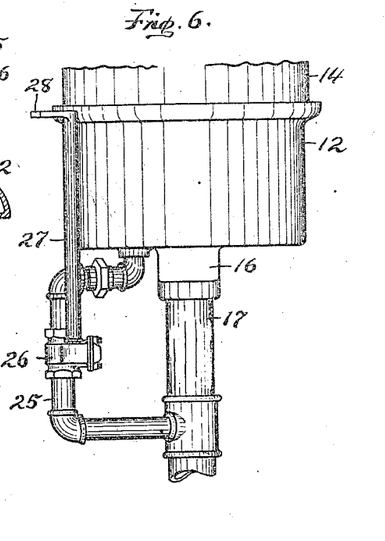
Fig. 6 is a projection from Fig. 5 with parts omitted.
Figure 7:
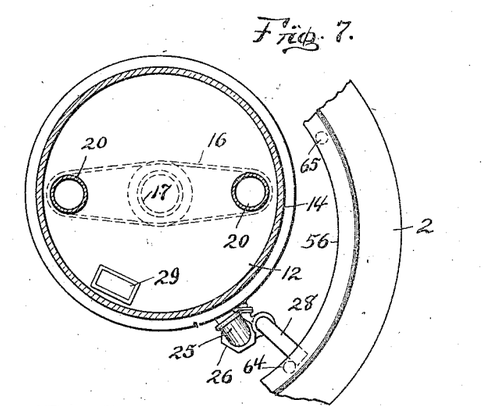
Fig. 7 is plan view of Fig. 5.
Figure 8:
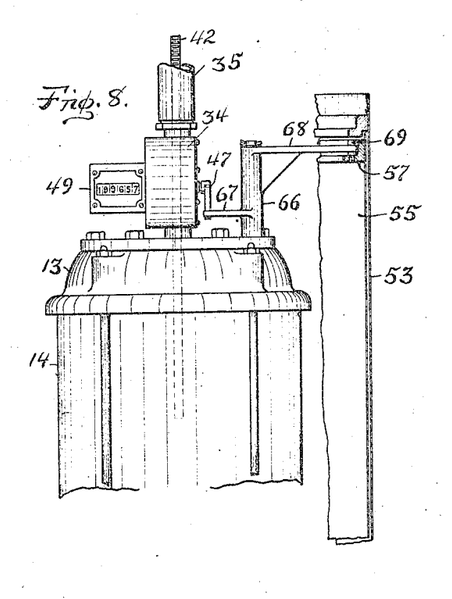
Fig. 8 is a detail view of the upper part of the measure including the meter and means for throwing it into and out of gear.
Figure 9:
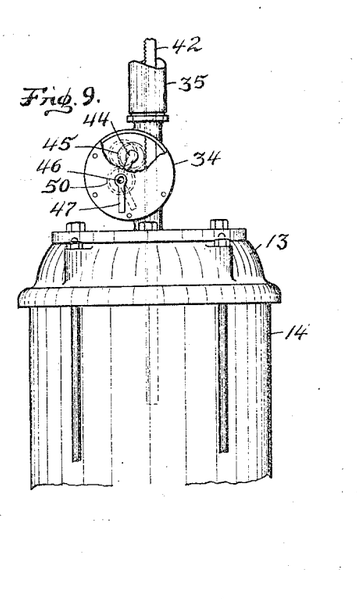
Fig. 9 is a projection from Fig. 8 with parts omitted.
Figure 10:
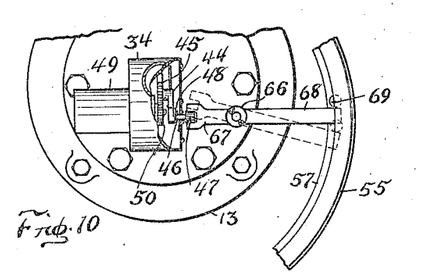
Fig. 10 is a plan view projected from Fig. 8 with parts cut away.
Figures 11, 13, 14:
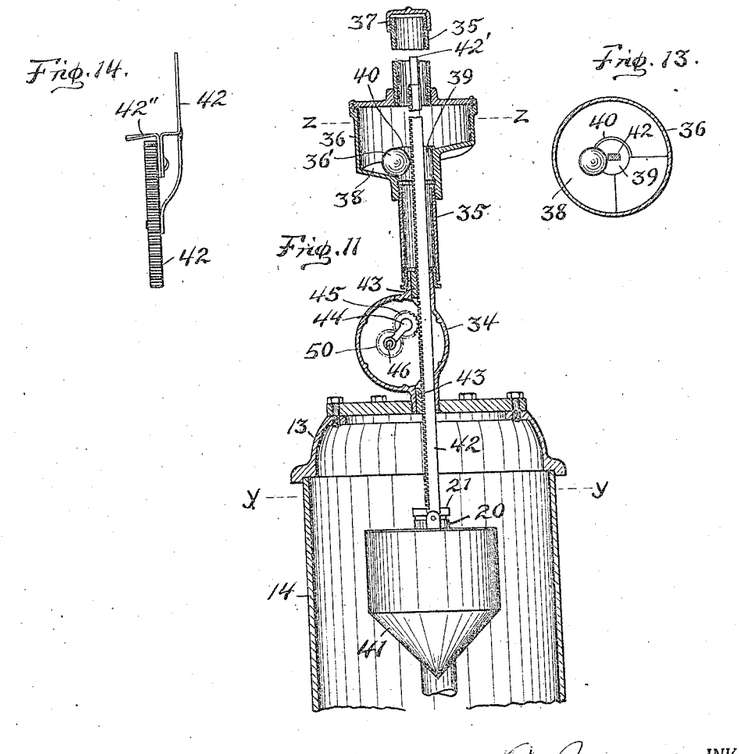
Fig. 11 is a detail view showing a vertical section of the upper part of the measure and the compensating device and including also the float for operating the meter.
Fig. 13 is a transverse section of Fig. 11 on the line z—z thereof.
Fig. 14 is a detail view upon an enlarged scale showing the detent guard attached to the rack-bar of the float.
Figure 12:
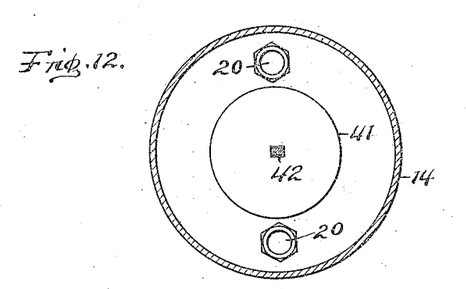
Fig. 12 is a transverse section of Fig. 11 on the line y—y thereof.
Figure 15:
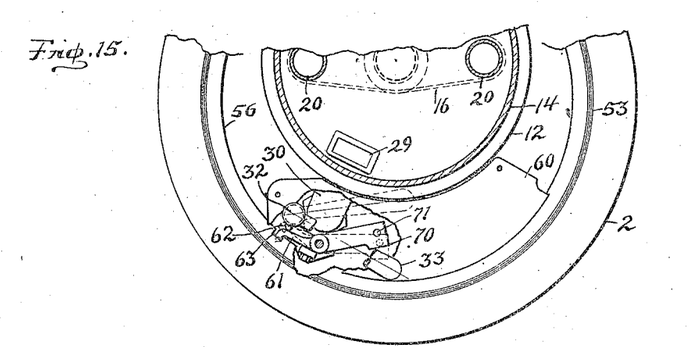
Fig. 15 is a detail view showing a plan of the interlocking mechanism for controlling the operations for filling the measure and delivering fuel therefrom, there being parts broken away and in section.
Figure 16:
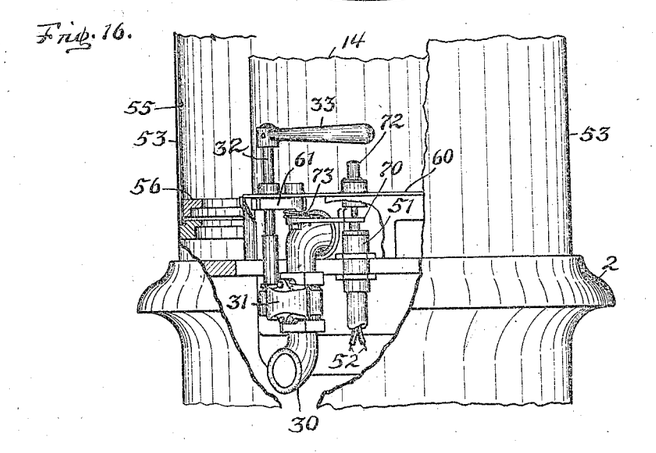
Fig. 16 is an elevation projected from Fig. 15 with parts shown broken away and in section; and, Fig. 17 is a detail view of the overflow pipe and extension sleeve therefor, parts being broken away.

A liquid measure is mounted upon the capital 2 and is comprised of a bowl 12, and cover 13 which are connected together by an intervening glass cylinder 14, the latter having graduations 15 marked thereon. The bowl has a manifold 16 in its base which has connected therewith an outlet pipe 17, the latter having connection with a return pipe 18 that is intended to extend back to the source of supply of fuel. An exterior vent pipe 19 has communication with the measure through the cover and also has connection with the return pipe 18. Within the measure are two vertical overflow pipes 20 that are open at their upper ends and each have communication through the bottom of the bowl with the manifold 16, and within the upper end of each overflow pipe is an adjustable extension sleeve 21, (Fig. 11), the purpose of which is to adjustably raise and lower the overflow level in the measure.

The bowl has an outwardly projecting pocket 22, and a feed-pipe 23 connected with the discharge-port of the pump 7 and the pocket 22 directs the flow of liquid from the pump into the measure. The feed-pipe has a plugged opening 24 for use in priming the pump.

A drain-pipe 25 communicates with the bowl 12 through the bottom thereof and connects also with the outlet pipe 17, and has a drain-valve 26 for controlling the flow of liquid from the measure back to the source of supply. The drain-valve 26 has a stem 27 with a lever 28 fixed at its upper end for its operation.

The bowl 12 has a discharge-port 29 that has communication with an external delivery-pipe 30 provided with a discharge-valve 31 for controlling the outflow of liquid from the measure. The discharge-valve 31 has a stem 32 with a handle 33 fixed at its upper end for its operation.

Upon the cover 13 is mounted a gear-case 34 from which extends a tubular column 35, the latter having an interposed drum 36. The column is closed at the top by a cap 37. The inner face of the drum extends in a spirally declining plane, forming a race-way 38 around a central opening 39 which is guarded upon one side by an upwardly projecting ledge 40.

Within the measure is a float 41 having fixed to its top a rack-bar 42 which extends upwardly through the gear-case and column. The float is adapted to be raised and lowered by the rise and fall of liquid in the measure, and the rack-bar is guided in its vertical movements by bearings 43.

A crank 44 is mounted to swing within the gear-case and has a pinion 45 pivoted thereon which is adapted to be moved into and out of mesh with the rack-bar accordingly as the crank is adjustably positioned. The axle 46 of the crank extends through the end of the gear-case and has fixed upon its projecting end a lever 47 for its operation. A spring 48 coiled about the axle and bearing against the crank acts to hold the pinion 45 in mesh with the rack-bar.

A counter, or meter 49, is attached to one end of the gear-case with its driving pinion 50 positioned in axial alignment with the axle 46 of the crank and in constant mesh with the pinion 45 so as to be actuated thereby when the latter is rotated by movement of the rack-bar.

At the upper end of the rack-bar 42 and to one side thereof is secured a detent-guard 42' which projects beyond the top of the rack-bar, and a striking plate 42'' extends horizontally at a point below the projecting end of the detent-guard. A spherical weight 36' is loosely contained within the drum 36 and rests at the lower part of the race-way and bears slightly against the rack-bar. As the measure is emptied through the discharge-valve, the float and rack-bar descend and the weight is detained in the drum by the detent-guard until the latter passes the race-way and allows the weight to drop down upon the striking-plate, thus accentuating the action of the rack-bar and assuring the completion of its downward stroke and corresponding action of the counter. As the measure is replenished and the float and rack-bar rise, the weight falls from the striking-plate into the drum and rolls down the inclined race-way to its former position against the rack-bar in readiness for a repetition of the operation.

The electric motor 6 is controlled by an electric switch 51 which is connected in series with the motor and a source of electric energy by conductors 52 in the customary manner, the switch being mounted on the capital. It is the intention that the switch shall be operable and the measure consequently replenished only while the discharge-valve 31 is closed, to obviate continuous passage of liquid through the measure without corresponding action of the counter; also that the discharge-valve 31 shall be opened and liquid drawn from the measure only when the drain-valve 26 is closed, so that the action of the counter will correspond with the amount of liquid dispensed from the measure; and it is furthermore the intention that the counter shall be inoperable when the drain-valve is open and the liquid in the measure is drained back to the supply tank (not shown), so that action of the counter will be had only when liquid is dispensed from the measure.

To effect these several conditions, a housing, hereinafter described, is mounted upon the capital so as to enclose the measure together with the discharge-valve handle, the electric switch, the drain-valve lever, and the mechanism for disengaging the rack-bar pinion, and arranged to have cooperative relation therewith.

The housing is comprised of a cylindrical shell 53 having diametrically opposite doorways 54, and in which are arranged revolving doors 55 correspondingly disposed to close the respective doorways. The doors 55 are each secured to a pair of rings 56 and 57 so as to be revolved simultaneously within the shell away from the doorways and thus expose the measure from the opposite sides of the housing.

Upon the top of the shell 53 is mounted a dome 58 which is surmounted by an illuminating globe 59. Also, within the housing upon the capital, is secured a shield 60 positioned above the discharge-valve 31 and switch 51, with the stem 32 of the former extending through the shield. To the under side of the shield is pivoted a lock-arm 61 which is adapted to be moved outwardly by a lug 62 on the valve-stem 32 of the discharge-valve, the lug being positioned to actuate the lock-arm as the valve is opened. The ring 56, which is secured to and movable with the doors 55, has a recess 63 made therein to receive the out-turned end of the lock-arm, and is so located as to admit movement of the valve-stem and lock-arm only when the doors are in wide open position. The ring 56 also has a projecting pin 64 located so as to engage the lever 28 on the stem of the drain-valve 26 and hold the valve closed when the doors are in wide open position. Thus liquid may be withdrawn from the measure through the discharge-valve only when the drain-valve is closed. The ring 56 has another projecting pin 65 so located as to engage and move the lever 28 to open position as the doors are closed, thus allowing liquid remaining in the measure to return to the supply tank while the discharge-valve is inoperative.

A rocking member 66 is pivoted on the cover 13 and has a forked arm 67 for actuating the lever 47 to disengage the pinion 45 from the rack-bar, and the member has also an arm 68 which is engaged and moved by a pin 69 on the ring 57 when the doors are shifted to closed position. The pin 69 is so positioned that the counter becomes inoperative simultaneously with the opening of the drain-valve, thus the counter is uneffected by the return of liquid from the measure to the supply tank.

A guard 70 has fixed relation with the lock-arm 61 and extends over the switch 51, and an opening 71 in the guard admits the application of pressure upon the switch by a push-button 72 which is mounted on the shield 60 above the switch, so that the latter may be actuated only when the opening is in alignment between the push-button and switch. A spring 73 is arranged to hold the lock-arm 61 and guard 70 in normal position so that when the discharge-valve is closed, the switch may only then be actuated by manipulating the push-button.

An electrical conduit 74 extends within the pedestal and housing and projects up into the globe 59, and has a terminal box 75 at its lower end, and supports a switch 76 for controlling the lamps 77 and 78 located respectively in the housing and globe. The conduit contains the usual conductors for supplying energy to the lamps.

In the operation of the invention, the doors are revolved to wide open position so that the drain-valve becomes closed and the counter engaged in gear with the rack-bar, and also exposing the measure, the discharge-valve handle, and the push-button for controlling the motor. While the discharge-valve is closed, the measure is filled to over-flowing by pressing the push-button which effects operation of the pump through the medium of the motor, the surplus liquid passing into the overflow pipes 20 from whence it flows successively through the manifold, outlet pipe, and return pipe into the supply tank. The liquid remaining in the measure is then delivered to the patron through the discharge-valve, the opening of which causes the guard to move so as to prevent closing the motor switch and consequent operation of the pump. When operations of the apparatus are suspended, the doors are moved to closed position which causes disengagement of the counter, opening of the drain-valve, and locking of the discharge-valve. The liquid left in the measure drains back to the supply tank, thus reducing the danger of fire in the event the apparatus becomes accidentally broken.

What I claim is:—

1. In liquid dispensing apparatus, a measure having means in connection therewith for filling and emptying the same, and having also a valve-controlled drain independently operable respecting the emptying means; a float in the measure having a rack-bar in connection therewith; a counter having normal driven relation with the rack-bar; and a mechanism associated with the valve-controlled drain for the disengagement of the counter with the rack-bar when the drain-valve is in open position.

2. In a liquid dispensing apparatus, a measure for holding and displaying liquid and having means in connection therewith for filling and emptying the same, and having also a valve-controlled drain; and a movable closure for the measure having engaging means in connection therewith for closing or opening the drain-valve accordingly as the closure is opened or shut and including mechanism for preventing the simultaneous operation of the emptying means and drain.

3. In liquid dispensing apparatus, in combination with a measure for holding and displaying liquid, having a dispensing discharge outlet and a valve-controlled drain; and a movable closure for the measure having engaging means in connection therewith for closing or opening the drain valve accordingly as the closure is opened or shut and including mechanism for preventing simultaneous operation of the outlet and drain.

4. In a liquid dispensing apparatus, a closed measure for holding and displaying liquid, including means for filling and emptying the same, and having also an overflow pipe and a vent connecting the top of the measure and the overflow pipe.

5. In dispensing apparatus having a measure for holding and displaying a quantity of liquid, a filling means for the measure; an emptying means for the measure; a valve controlled drain for the measure independently operable respecting the emptying means; a float mechanism in the measure; a counter having normal driven relation with the float mechanism; and means for the disengagement of the counter with the float mechanism when the drain valve is opened.

6. A liquid dispensing apparatus having a measure and means for charging the same and a valve-controlled outlet for dispensing liquid therefrom; a valve-controlled drain for the measure; and a closure for the measure having means in connection therewith, and also with the drain-valve and dispensing valve, adapted to prevent simultaneous operation of the drain-valve and dispensing-valve.

7. A liquid dispensing apparatus having a measure and means for charging the same and for dispensing liquid therefrom; a float-driven counter actuated by the movement of liquid discharged from the measure; a valve-controlled drain for the measure; and a mechanism co-operative with the drain-valve and the counter, adapted to disengage the counter and open the drain-valve simultaneously.

8. In liquid dispensing apparatus, a pedestal; a housing mounted upon the pedestal and having diametrically opposite doorways; two doors having rigid connecting means and arranged to be revolved within the housing and close the respective doorways.

9. In liquid dispensing apparatus, a pedestal; a housing on the pedestal, having doorways and means for closing the same; a measure in the housing having a dispensing valve the operating handle of which is contained within the housing; a pump within the pedestal having connection with the measure; a motor for actuating the pump, including a switch for controlling the motor; and a mechanism in operable relation with the dispensing valve adapted to prevent operation of the switch when the dispensing valve is open.

10. In a liquid dispensing apparatus, a base and a capital arranged with a space therebetween; a frame connecting the base and capital; a shell for enclosing said space and frame; a housing on the pedestal having opposite doorways; doors having rigid connected relation arranged to be revolved in the housing and close the respective doorways; a graduated transparent measure mounted on the capital and extending into the housing between the doors; and a pumping mechanism contained within the shell and having connection with the measure for supplying it with liquid.

11. In liquid dispensing apparatus, a closed graduated measure having an overflow outlet pipe with a return pipe connected therewith; a vent pipe having connection with the measure at a point above the level of its overflow outlet and having connection with the return pipe and affording an inclosed communicating passage-way between the top of the measure and the return pipe; and a valve-controlled drain connecting the bottom of the measure and the overflow outlet pipe, said measure having a valve-controlled dispensing outlet operably independent of the drain.

12. In a dispensing device the combination with a pump and mechanism to operate it, of a bowl adapted to receive the fluid delivered by the pump, a discharge pipe in communication with the bowl, means to control the latter communication, a drain pipe having communication with the bowl, means to control the latter communication, means to actuate the discharge pipe controlling means and to lock the pump mechanism and means to actuate the drain pipe controlling means automatically operated by the closing of a door.

13. In liquid dispensing apparatus, a measure having a dispensing valve; a pump having connection with the measure for filling the same; a motor for actuating the pump including a switch for controlling the motor; and a mechanism actuated by the dispensing valve adapted to prevent operation of the switch when the dispensing valve is open.

14. In liquid dispensing apparatus, a measure having a dispensing valve and a drain valve; a pumping means for filling the measure including a controlling device; means for actuating the drain-valve; and mechanism actuated by the dispensing valve adapted to prevent operation of the controlling device and opening of the drain-valve while the dispensing valve is open.

15. In liquid dispensing apparatus, a housing having an opening and a door for closing same; a measure in the housing having a dispensing valve and drain-valve; a mechanism operable by the door for closing the drain-valve when the door is open; a pump for filling the measure; and mechanism in connection with the dispensing valve adapted to lock the door in open position when the dispensing valve is opened.

16. In a dispensing apparatus, a housing having an opening and a door for closing same; a measure in the housing having a dispensing valve and drain-valve; a mechanism operable by the door for closing the drain-valve when the door is open; a pump mechanism for filling the measure including controlling means for same; and a mechanism operable by the dispensing valve adapted to lock the door in open position and prevent operation of the controlling means when the dispensing valve is opened.

17. In a dispensing apparatus having an opening and a door for closing the same; a measure in the housing having a dispensing valve and drain-valve and pumping mechanism for filling the measure; a mechanism operable by the door for closing the drain-valve when the door is open; and means operable by the dispensing valve and the door adapted to lock the door in open position when the dispensing valve is opened and to prevent opening of the dispensing valve until the door is opened and the drain-valve closed.

18. In a dispensing device, the combination with a bowl including means for filling it with liquid, of a discharge means in communication with the bowl, a valve controlled drain for the bowl independently operable respecting the discharge means, and a lock controlled movable member adapted to prevent operation of the discharge means and to automatically open the valve of said drain.

19. In a dispensing device, the combination with a bowl adapted to receive and hold a quantity of liquid, of a filling means for the bowl, a discharge means in communication with the bowl, a valve controlled drain for the bowl, and a lock controlled movable member for preventing operation of said filling and discharge means and to automatically open the valve of said drain.

In testimony whereof I affix my signature, in presence of two witnesses.

MATTHEW B. MUXEN.

Witnesses:
IRMA HUGUENARD,
FRIEDA HERMUTH.